(12) United States Patent
Hsieh

(10) Patent No.: US 7,397,514 B2
(45) Date of Patent: Jul. 8, 2008

(54) MULTIMEDIA PRESENTATION SYSTEM AND METHOD THEREFOR

(75) Inventor: Kuan-Hong Hsieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 558 days.

(21) Appl. No.: 11/025,811

(22) Filed: Dec. 28, 2004

(65) Prior Publication Data

US 2005/0185096 A1   Aug. 25, 2005

(30) Foreign Application Priority Data

Feb. 23, 2004   (CN) .................. 2004 1 0015497

(51) Int. Cl.
*H04N 5/50* (2006.01)
(52) U.S. Cl. .................. 348/569; 348/734; 348/725
(58) Field of Classification Search ............ 348/734, 348/569, 552, 563, 570, 589, 601, 40; 725/40
See application file for complete search history.

(56) References Cited

U.S. PATENT DOCUMENTS

| | | | | |
|---|---|---|---|---|
| 5,020,139 | A * | 5/1991 | Keenan | .............. 455/151.2 |
| 5,589,893 | A * | 12/1996 | Gaughan et al. | ............. 725/37 |
| 6,469,633 | B1 * | 10/2002 | Wachter | ............. 340/825.69 |
| 6,636,273 | B1 | 10/2003 | Weber | ............. 348/734 |
| 2002/0075409 | A1 | 6/2002 | Kwon et al. | ............. 348/569 |
| 2002/0122079 | A1 | 9/2002 | Yakov et al. | |

* cited by examiner

*Primary Examiner*—M. Lee
(74) *Attorney, Agent, or Firm*—Morris Manning Martin LLP; Tim Tingkang Xia, Esq.

(57) ABSTRACT

A multimedia presentation system includes: a display unit (120) for displaying multimedia information and an On Screen Display (OSD) menu; a control unit (110) including the multifunctional button for receiving a user operation, generating a control signal corresponding to the operation, and transmitting the control signal; and a processing unit for receiving the control signal, and performing corresponding one or more operations for the display unit according to the control signal. The operations include turning on or turning off the display unit, entering the OSD menu, and confirming one or more operations on the OSD menu. A related method implementing the system is also disclosed.

8 Claims, 3 Drawing Sheets

MULTIMEDIA PRESENTATION SYSTEM AND METHOD THEREFOR

BACKGROUND OF THE INVENTION

1. Field of the Invention

The present invention relates to multimedia presentation systems and methods, and particularly to a multimedia presentation system with a multifunctional button, and a related multimedia presentation method.

2. Background of the invention

The development of multimedia technology has brought consumers multimedia presentation systems such as television (TV) viewing systems (e.g., cable TV, digital TV) and computers with monitors. These systems provide a plurality of functions for a user to control various parameters of the systems. Generally, a user is provided with a control unit which has many buttons. Each button corresponds to a single function, and can only control one particular parameter. The more functions provided by the multimedia presentation system, the more the number of buttons needed on the control unit.

A large number of buttons may detract from the aesthetic appearance of the control unit, and can be inconvenient for user operation. In addition, the large number of buttons adds to production costs.

Accordingly, what is need is a system and method which can achieve many functions via one single button.

SUMMARY OF THE INVENTION

A main objective of the present invention is to provide a multimedia presentation system, in which a multifunctional button can perform functions such as turning on/off a display unit, entering an On Screen Display (OSD) menu, and confirming operations on the OSD menu.

Another objective of the present invention is to provide a multimedia presentation method using a multifunctional button, in which the button can perform functions such as turning on/off the display unit, entering an OSD menu, and confirming operations on the OSD menu.

To accomplish the first of the above objectives, the present invention provides a multimedia presentation system. The system comprises a display unit for displaying multimedia information and an OSD menu; a control unit comprising a multifunctional button for receiving a user operation, generating a control signal corresponding to the operation, and transmitting the control signal; and a processing unit for receiving the control signal, and performing corresponding one or more operations for the display unit according to the control signal. The operations comprise turning on or turning off the display unit, entering the OSD menu, and confirming one or more operations on the OSD menu.

To achieve the second of the above objectives, the present invention provides a preferred multimedia presentation method. The method comprises the steps of: (a) turning on the display unit if the display unit is powered on and a multifunctional button is pressed; (b) turning off the display unit if a duration of a second pressing of the multifunctional button has reached a predetermined threshold duration; (c) measuring the duration of the second pressing of the multifunctional button; (d) displaying an OSD menu on the display unit if the multifunctional button is released prior to expiration of threshold duration; (e) displaying different prompt on the display unit according to the duration of second pressing of the multifunctional button; and (f) confirming one or more operations on the OSD menu through the multifunctional button, after the OSD menu is displayed on the display unit.

Other objects, advantages and novel features of the present invention will be drawn from the following detailed description of a preferred embodiment and the preferred method of the present invention with the attached drawings, in which:

DETAILED DESCRIPTION OF THE INVENTION

A multifunctional button may be implemented in various multimedia presentation systems, such as a television (TV) set or a computer. Each multimedia presentation system generally comprises a display unit, a control unit, and a processing unit.

Figure 1:
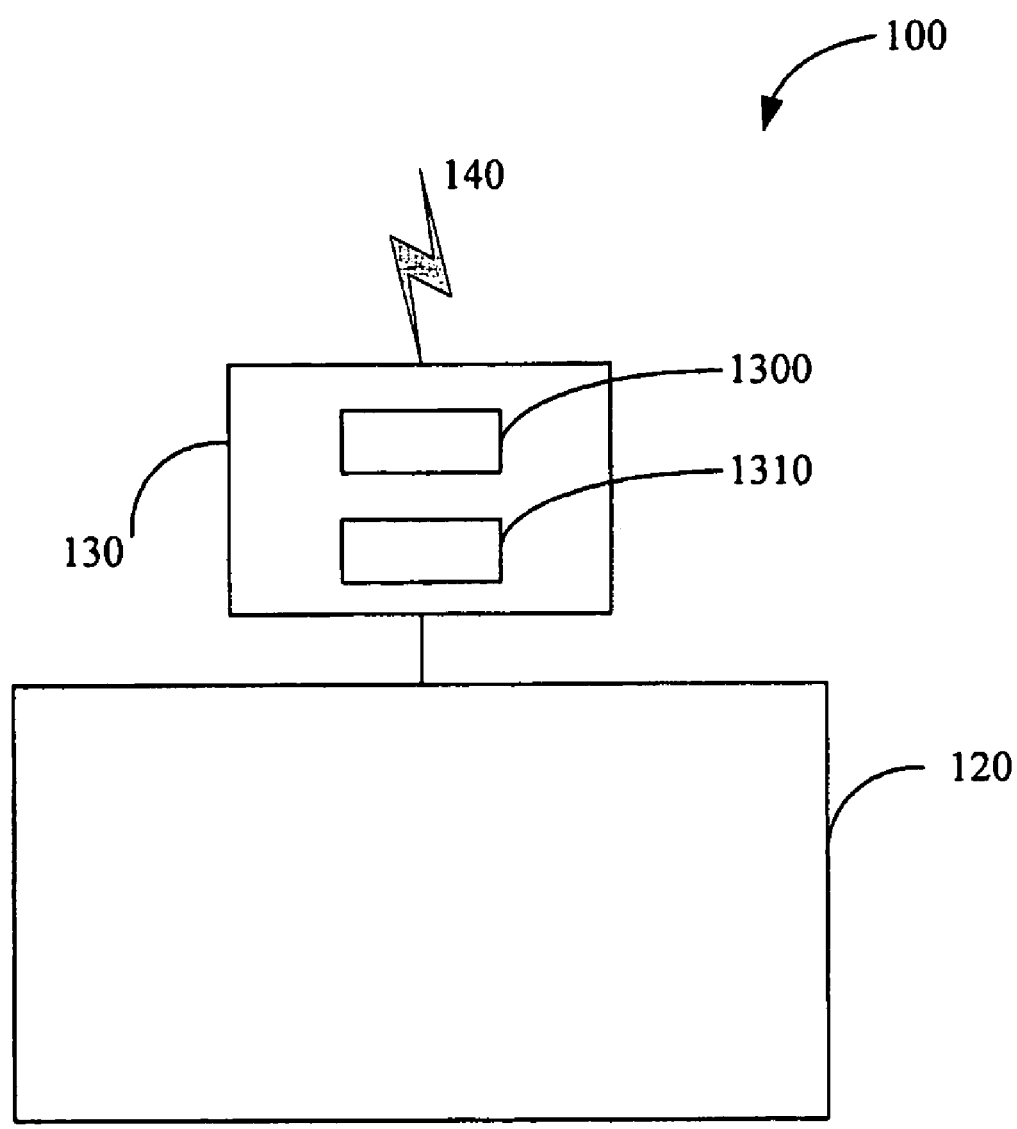
FIG. 1 is a schematic diagram of hardware configuration of a multimedia presentation system in accordance with the preferred embodiment of the present invention.

FIG. 1 is a schematic diagram of hardware configuration of a multimedia presentation system 100 (hereinafter, "the system") in accordance with the preferred embodiment of the present invention. The system 100 includes a TV set 120, a set-top box 130, and a remote controller 110. The TV set 120 displays not only multimedia information but also OSD menus if necessary. The set-top box 130 is coupled to the TV set 120, and includes a processor 1300 and a memory 1301. The memory 1301 stores configuration parameters and application programs for implementing the system 100. The remote controller 110 includes the multifunctional button 1100 and other functional buttons (not shown), for generating and sending infrared signals to the set-top box 130 so as to control the TV set 120. The multifunctional button 110 is for implementing various functions, such as turning on/off the TV set 120, entering an OSD menu, and confirming operations on the OSD menu. The various functions are implemented according to durations of time periods that a user presses the multifunctional button 1100. The set-top box 130 is also connected with a network (not shown) via a connection means 140, which provides programs for the TV set 120. The connection means 140 may be an analog cable, a digital cable, an optical fiber, a digital subscriber line (DSL), an antenna, a wireless cable, or a local multi-channel distribution system (LMDS).

Figure 2:
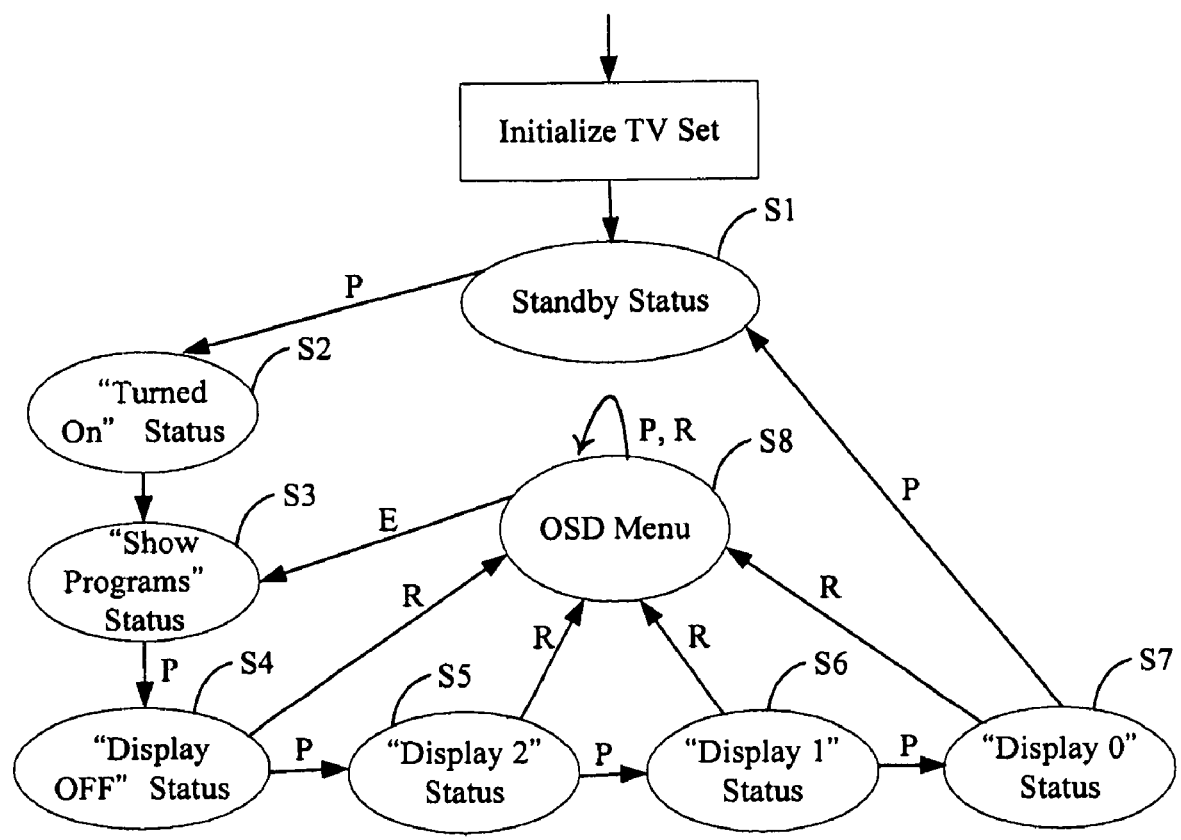
FIG. 2 is a schematic diagram showing various statuses of a TV set when a user operates a multifunctional button of the system of FIG. 1.

FIG. 2 is a schematic diagram showing various statuses of the TV set 120 when the user operates the multifunctional button 1100, wherein "P" represents pressing the multifunctional button 110, "R" represents releasing the multifunctional button 110, "P, R" represents pressing the multifunctional button 110 and releasing the multifunctional button 110, and "E" represents exiting the OSD menu. Once the system 100 connects with a power source (not shown in FIG. 1), the processor 1300 in the set-top box 130 automatically initializes the configuration parameters stored in the memory 1301, in order to activate the TV set 120. Thereupon, the TV set 120 enters a standby status (S1). In the standby status, the TV set 120 does not show programs, and only can receive a "turn on" control signal from the set-top box 130. When the TV set 120 receives the "turn on" control signal from the set-top box 130, this means that the multifunctional button 1100 has been pressed to generate the "turn on" control signal. The TV set 120 is switched to a "turned on" status (S2), and starts to show programs (S3). In the "turned on" status, the TV set 120 may be switched to a series of "turn off prompt" statuses, depending upon the duration of a time period that the user again presses the multifunctional button 1100.

When the duration of pressing of the multifunctional button 1100 is less than or equal to 0.4 seconds, the TV set 120 is switched to a first "turn off prompt" status (S4), and displays an "OFF" message to indicate that the TV set 120 has entered a first "turn off" phase. When the duration of pressing of the multifunctional button 1100 is between 0.4 and 1.1 seconds, the TV set 120 is switched to a second "turn off prompt" status (S5), and displays a "2" message to indicate that the TV set 120 has entered a second "turn off" phase. When the duration of pressing of the multifunctional button 1100 is between 1.1 and 1.8 seconds, the TV set 120 is switched to a third "turn off prompt" status (S6), and displays a "1" message to indicate that the TV set 120 has entered a third "turn off" phase. When the duration of pressing of the multifunctional button 1100 is between 1.8 and 2.0 seconds, the TV set 120 is switched to a fourth "turn off prompt" status (S7), and displays a "0" message to indicate that the TV set 120 has entered a fourth "turn off" phase. When the duration of pressing of the multifunctional button 1100 reaches 2.0 seconds or more, the TV set 120 is switched to the standby status (S1), and stops showing programs.

Further, during any of the series of "turn off" phases, once the multifunctional button 1100 is released, the TV set 120 is switched to an "OSD menu" status (S8). In the "OSD menu" status, the TV set 120 displays an OSD menu including various function control targets (e.g., volume, contrast, and brightness) for the user to adjust. In this status, the multifunctional button 1100 is used for confirming operations on selected function control targets of the OSD menu. After the user has confirmed operations on selected function control targets, the user can select to exit and close the OSD menu. Otherwise, if the user does not select to exit and close the OSD menu, the OSD menu is automatically closed. Further, if the user does not confirm operations on selected function control targets, the OSD menu is automatically closed. When the OSD menu is closed, the TV set 120 is automatically switched to the "show programs" status (S3) and continues to show programs.

Figure 3:
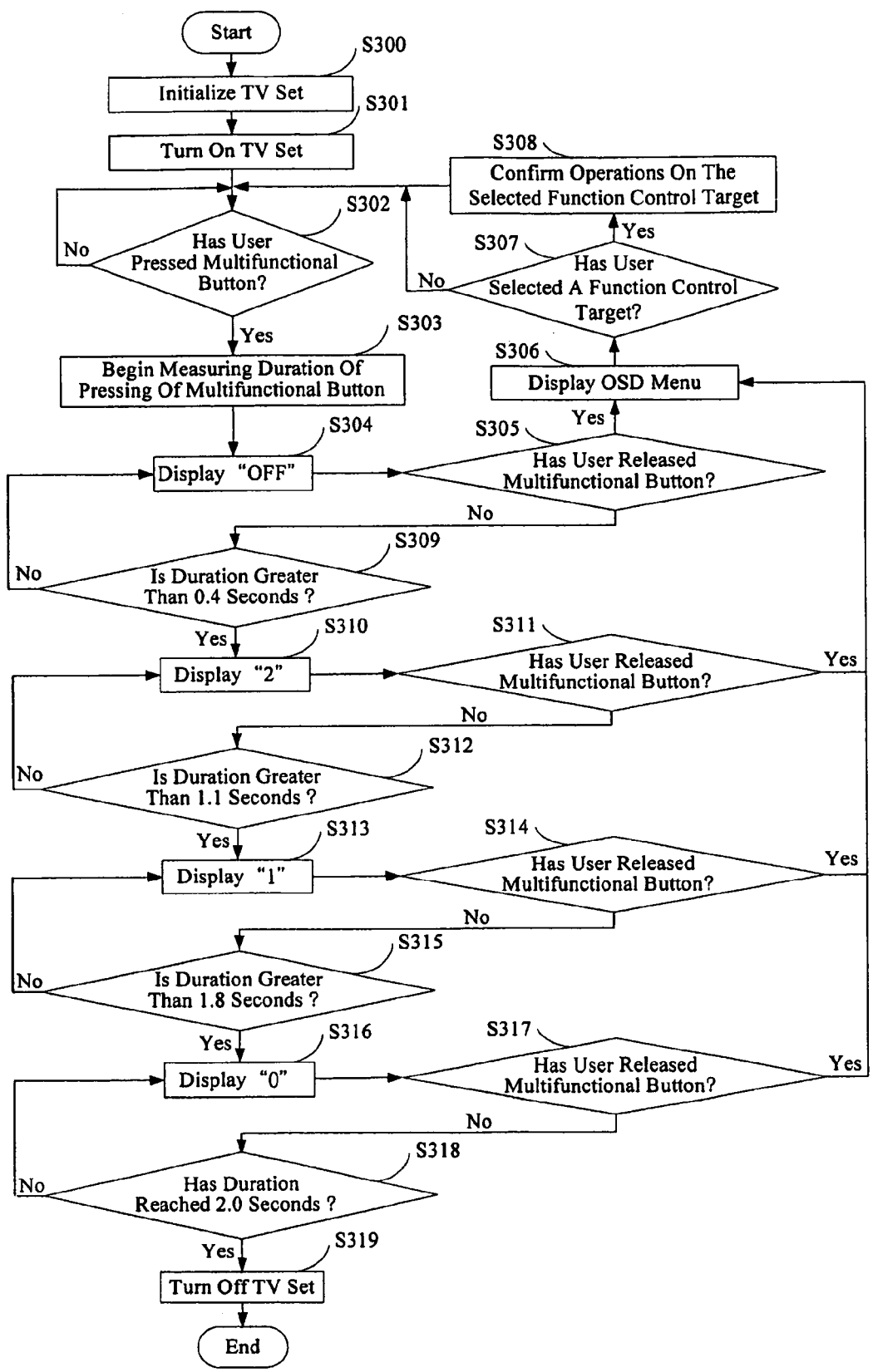
FIG. 3 is a flowchart of the preferred method for implementing the system of FIG. 1.

FIG. 3 is a flowchart of the preferred method for implementing the system 100. In step S300, when the multimedia presentation system 100 is connected to a power source, the processor 1300 in the set-top box 130 automatically initializes configuration parameters of the TV set 120, and the TV set 120 enters a "standby" status. In step S301, the processor 1300 turns on the power source of the TV set 120, according to a "turn on" control signal received from the multifunctional button 1100, and the TV set 120 enters a "turned on" status and starts to show programs. In step S302, the processor 1300 periodically determines whether a user has pressed the multifunctional button 1100 again. If and when the processor 1300 determines that the user has pressed the multifunctional button 1100, in step S303, the processor 1300 begins to measure a duration of pressing of the multifunctional button 1100. Then in step S304, the TV set 120 enters a first "turn off prompt" status and displays an "OFF" message. In step S305, the processor 1300 determines whether the user has released the multifunctional button 1100. If the user has not released the multifunctional button 1100, the procedure goes to step S309 described below. In contrast, if the user has released the multifunctional button 1100, in step S306, the TV set 120 enter an "OSD menu" status and displays an OSD menu. Then in step S307, the processor 1300 determines whether the user has selected any function control targets of the OS1 menu to adjust. If the user has selected a function control target of the OSD menu, in step S308, the processor 1300 confirms operations on the selected function control target through the multifunctional button 1100, whereupon the procedure returns to step S302 described above. In contrast, if the user has not selected any function control targets to adjust, the procedure directly returns to step S302 described above.

In step S309, the processor 1300 determines whether the duration of pressing of the multifunctional button 1100 is greater than 0.4 seconds. If the duration is less than or equal to 0.4 seconds, the procedure returns to step S304 described above. Otherwise, if the duration is greater than 0.4 seconds, in step S310, the TV set 120 enters a second "turn off prompt" status and displays a "2" message. Then in step S311, the processor 1300 determines whether the user has released the multifunctional button 1100. If the user has released the multifunctional button 1100, the procedure goes to step S306 described above. Otherwise, if the user has not released the multifunctional button 1100, the procedure goes to step S312 described below.

In step S312, the processor 1300 determines whether the duration of pressing of the multifunctional button 1100 is greater than 1.1 seconds. If the duration is less than or equal to 1.1 seconds, the procedure returns to step S310 described above. In contrast, if the duration is greater than 1.1 seconds, in step S313, the TV set 120 enters a third "turn off prompt" status and displays a "1" message. Then in step S314, the processor 1300 determines whether the user has released the multifunctional button 1100. If the user has released the multifunctional button 1100, the procedure goes to step S306 described above. Otherwise, if the user has not released the multifunctional button 1100, the procedure goes to step S315 described below.

In step S315, the processor 1300 determines whether the duration of pressing of the multifunctional button 1100 is greater than 1.8 seconds. If the duration is less than or equal to 1.8 seconds, the procedure goes to step S313 described above. In contrast, if the duration is greater than 1.8 seconds, in step S316, the TV set 120 enters a fourth "turn off prompt" status and displays a "0" message. Then in step S317, the processor 1300 determines whether the user has released the multifunctional button 1100. If the user has released the multifunctional button 1100, the procedure goes to step S306 described above. Otherwise, if the user has not released the multifunctional button 1100, in step S318, the processor 1300 determines whether the duration of pressing of the multifunctional button 1100 has reached 2.0 seconds. If the duration has not reached 2.0 seconds, the procedure returns to step S316. In contrast, if the duration has reached 2.0 seconds, in step S319, the processor 1300 turns off the TV set 120, whereupon the procedure is ended.

Although the present invention has been specifically described on the basis of a preferred embodiment and preferred method, the invention is not to be construed as being limited thereto. Various changes or modifications may be made to said embodiment and method without departing from the scope and spirit of the invention.

What is claimed is:

1. A multimedia presentation system, comprising:
 a display unit for displaying multimedia information and an On Screen Display (OSD) menu;
 a multifunctional button for receiving a user's operation, generating a control signal corresponding to the operation, and transmitting the control signal; and a processing unit for receiving the control signal, and performing corresponding one or more operations for the display unit according to the control signal, wherein said operations comprise turning on the display unit if the display unit is powered on and the multifunctional button is pressed, turning off the display unit if a duration of a second pressing of the multifunctional button has reached a predetermined threshold duration, entering a status and displaying an OSD menu on the display unit if the multifunctional button is released prior to expiration of the predetermined threshold duration.

2. The multimedia presentation system as described in claim 1, wherein the display unit enters any one or more other statuses and displays corresponding OSD menus, depending upon a duration of pressing of the multifunctional button when the display unit is in a first status.

3. A multimedia presentation method, comprising the steps of:
- providing a display unit and a multifunctional button;
- turning on the display unit if the display unit is powered on and the multifunctional button is pressed;
- turning off the display unit if a duration of a second pressing of the multifunctional button has reached a predetermined threshold duration; and
- displaying an OSD menu on the display unit if the multifunctional button is released prior to expiration of the threshold duration.

4. The method of claim 3, further comprising the step of measuring the duration of the second pressing of the multifunctional button.

5. The method of claim 3, further comprising the step of displaying different messages on the display unit according to the duration of second pressing of the multifunctional button.

6. The method of claim 3, further comprising the step of confirming one or more operations on the OSD menu through the multifunctional button, after the OSD menu is displayed on the display unit.

7. A method for operating a multimedia presentation system, comprising the steps of:
- providing a button for controlling display of said system;
- starting said display of said system by means of pressing said button;
- shutting off said display of said system by means of pressing said button another time and longer than a predetermined threshold duration; and
- displaying an On Screen Display (OSD) menu by said system in case that said button is released during said shutting-off step.

8. The method of claim 7, further comprising the step of displaying more than one signals to indicate that said system is ready to shut off during said shutting-off step.

* * * * *